United States Patent [19]

Arnold et al.

[11] Patent Number: 4,713,812

[45] Date of Patent: Dec. 15, 1987

[54] METHOD AND APPARATUS FOR REPLACEMENT OF DATA AND OF A DATA MEMORY IN AN AUTOMOTIVE-TYPE ELECTRONIC CONTROL SYSTEM

[75] Inventors: Herbert Arnold, Eberdingen; Michael Horbelt, Kleinglattbach; Werner Jundt, Ludwigsburg, all of Fed. Rep. of Germany

[73] Assignee: Robert Bosch GmbH, Stuttgart, Fed. Rep. of Germany

[21] Appl. No.: 838,176

[22] Filed: Mar. 10, 1986

[30] Foreign Application Priority Data

May 25, 1985 [DE] Fed. Rep. of Germany ....... 3518964

[51] Int. Cl.[4] ............................................... G06F 11/04

[52] U.S. Cl. ......................................... 371/10; 371/11; 364/900

[58] Field of Search ............... 371/10, 8, 11; 365/200, 365/201; 364/200, 900

[56] References Cited

U.S. PATENT DOCUMENTS

| | | | |
|---|---|---|---|
| 4,191,996 | 3/1980 | Chesley | 371/10 |
| 4,346,459 | 8/1982 | Sud | 371/10 |
| 4,380,066 | 4/1983 | Spencer | 371/10 |
| 4,464,736 | 8/1984 | Smith et al. | 371/10 |
| 4,464,754 | 8/1984 | Stewart | 371/10 |

OTHER PUBLICATIONS

"Bosch Technische Berichte", (Bosch Technical Reports), vol. 5, 1977, issue 5/6.

Intel Component Data Catalog, 1980, pp. 5—1, 5—3 & 5—6, RE 8021 Single—Chip Microprocessor.

*Primary Examiner*—Michael R. Fleming

*Attorney, Agent, or Firm*—Frishauf, Holtz, Goodman & Woodward

[57] ABSTRACT

To reduce waste and scrap of automotive electronic computer-type control apparatus constructed in hybrid technology on a substrate, due to malfunction, incorrect programming or desired change in data stored in the memory chip of a read-only memory (ROM) also applied in hybrid technology to the substrate, the substrate has a socket for a standard plug-insertable ROM or programmable ROM hard-wired connected thereto, the memory chip being enabled by application of a voltage applied to a circuit having a severable bridge (12) so that, upon severance of the bridge, the logic voltage applied to the chip will be of the "disable" value, permitting insertion of a standard ROM or PROM (16) into the additional socket (9) for supply of replacement data, the additional socket being hard-wired to a terminal (15) having an "enable" reference potential thereon. Preferably, isolating or decoupling resistors (3) are included in the address lines between the microprocessor (1) and the memory chip (5) to decouple the memory chip address input from the address inputs (8) of the additional socket and hence the additional memory (16).

9 Claims, 1 Drawing Figure

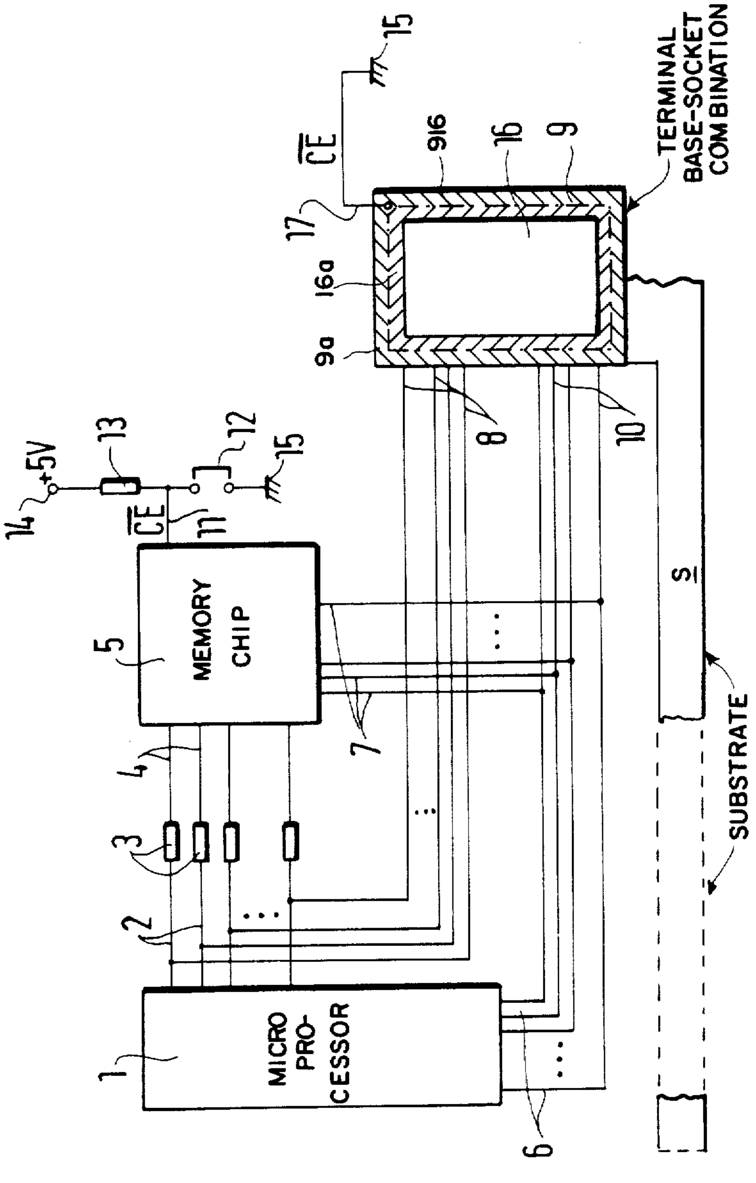
MICRO PRO- CESSOR
MEMORY CHIP
+5V
CE
TERMINAL BASE-SOCKET COMBINATION
SUBSTRATE
S

METHOD AND APPARATUS FOR REPLACEMENT OF DATA AND OF A DATA MEMORY IN AN AUTOMOTIVE-TYPE ELECTRONIC CONTROL SYSTEM

The present invention relates to electronic control apparatus for automotive vehicles, and more particularly for an engine or apparatus of an automotive vehicle, for example anti-lock brake apparatus, in which a microprocessor receives data from a data memory to provide operating control signals, and more particularly to replacement of the data memory if malfunction or erroneous output from the microprocessor should be detected.

BACKGROUND

The referenced publication "Bosch Technische Berichte" ("Bosch Technical Reports"), vol. 5, 1977, issue 5/6, page 253, describes an electronic ignition system which includes a microprocessor. The microprocessor receives input signals representative of engine speed, engine loading, and other signals, for example temperature, indicating whether the engine operates under starting conditions or the like. The computer—typically a microprocessor—then provides output signals representative of ignition instant, duration of current flow through an ignition coil, speed threshold levels and the like. To furnish the output data, a memory is provided which retains therein tables or other data specific to the vehicle and/or engine being used. These data are stored in a programmable read-only memory (PROM) which is interrogated by the computer to obtain the relevant data on which the computation can then be based.

It is well known that computers of this type utilize integrated circuits to be inserted in sockets. The arrangement should be such that, first, a readily programmable, typically an electrically erasable programmable read-only memory (EPROM) can be inserted in the respective socket, to be later on replaced by a non-erasable PROM. The system permits changing the data in the EPROM until the respective data stored therein are optimally matched to the desired performance upon computation in the microprocessor based on the data in the EPROM. These data, when they are found optimally suitable, are then transferred into a PROM, that is, a memory which is no longer erasable. The PROM could subsequently also be exchanged, for example due to a defect or if a specific data block therein should be changed.

Various types of computer arrangements use hybrid circuit technology. Integrated circuit (IC) chips, not yet packaged or irremovably encapsulated, are secured to a ceramic or ceramic-like substrate. Connections from the IC chips are then made with conductive tracks, formed in thick-film technology on the substrate material, by suitable connection of bonding wires between the terminals of the IC chips and the conductive tracks. Such hybrid circuits permit particularly compact design and construction. They are very light, and the low weight, and hence inertia, permits high mechanical loading thereof. No insertion terminals, for example plug-and-socket connections, are used. Such plug-and-socket connections frequently are the source of malfunction. The IC hybrid technology, thus, has a higher degree of reliability. Hybrid technology IC circuits are thus used increasingly not only in control systems for aircraft, but also for automotive-type or other vehicular control systems. Automotive-type control systems are subject to severe operating conditions: extremes in temperature variations, high mechanical loading, vibration, shock, and the like.

Use of non-packaged or raw PROM—IC chips has the disadvantage that these chips can be programmed only after the chip is secured and assembled with the remainder of the substrate, that is, only when the chip is connected by the bonding wires. Thus, any errors or malfunction in the PROM—IC chip cannot be detected until the PROM—IC chip is secured to the substrate, and the overall computer apparatus with the respective PROM—IC chip has been completely assembled and wires, including the connection of the bonding wires. Erroneous programming, also, cannot be detected before the PROM—IC chip is assembled. Exchange of an erroneously programmed or malfunctioning chip is not economically feasible and, in many situations, may not be possible. Thus, if there should be an error, a malfunction, or other defect in the PROM—IC chip, carrying the data, the entire hybrid circuit has to be scrapped.

THE INVENTION

It is an object to provide a method and an apparatus in a circuit arrangement utilizing hybrid IC technology in which the reject rate due to malfunctioning or incorrectly operating PROMs is eliminated or, at least, substantially reduced.

Briefly, the PROM—IC chip is formed with an "enable—disable" input terminal. The conductive tracks on the IC chip are connected, preferably, through an isolating resistor—not only to the PROM—IC chip, but, also, to a plug-and-socket connection for an additional PROM memory. Preferably, the additional PROM memory includes circuitry which, upon insertion into the respective socket, completes an "enabling" circuit therefor.

The system has the advantage that a PROM—IC chip which either is malfunctioning or has data which are not appropriate to the specific engine, or no longer appropriate to the engine—for example due to aging, retrofitting or modification thereof—can be disabled from providing its data to the microprocessor, and the function of the data storage or data memory is taken over by the additional PROM memory which can be located in a suitable and standard housing. The arrangement has the further advantage that subsequent data blocks can be added by addition of the additional PROM without requiring scrapping of a large-scale integrated circuit, formed in hybrid technology, which may well contain many additional functional computer elements beyond those of the microprocessor with which the particular PROM is associated. The reject rate or scrapping rate of expensive electronic components, thus, is substantially reduced.

The hybrid circuit, for example a substrate plate having conductive tracks thereon and connected circuit elements, further includes a base or a socket to receive a customary, commercial PROM memory, besides the other circuit components of the hybrid circuit. Unambiguous association between the respectively activated PROM memory and the computer or microprocessor is obtained by connecting the socket for the additional PROM already on the substrate plate so that further connections are not needed. Such connections are made by printed circuits, for example by thick-film technology. Consequently, the computer or microprocessor can be integrated with additional electronic components in a large-scale hybrid circuit using PROM memory chips, of customary construction, which provides a comparatively inexpensive overall computer element. Rejects, due to malfunctioning, improperly programmed, or obsolete PROM chips thus are eliminated. The hybrid circuits may, further, receive new set of data merely by adding the additional PROM or ROM memory, constructed in accordance with standard commercial memory construction.

DRAWING

The single FIGURE represents a schematic block circuit of an embodiment of the invention.

DETAILED DESCRIPTION

A microprocessor 1 has a plurality of address buses 2, coupled via decoupling resistors 3 with the address inputs 4 of a chip-type PROM memory 5. Data inputs 6 of the microprocessor are coupled with data outputs 7 of the memory chip.

In accordance with the invention, the respective address buses, forming address connection lines, and the memory buses, forming connection lines, are further connected to a push-in socket 9, having suitable push-in socket terminals, shown only schematically in the zone 9*a*. A commercial discrete semiconductor packaged and encapsulated PROM memory 16 has suitable address input and data output terminals, to be associated with the plug—socket terminals 8 and 10 for address and data on the socket 9. The connection is shown by a chain-dotted line 916, associating the socket 9 and the base of the additional memory 16. The showing, of course, is merely schematic.

The PROM 5 has an "enable-disable" terminal 16, adapted for connection of a source of voltage 14, which may, for example, have, respectively, high or low voltage, and, depending on the voltage applied, may activate or deactivate the PROM memory chip 5. The terminal 11 is connected to the junction of a resistor 13 which, in turn, is connected to a supply terminal 14, and another branch from the junction is passed over a separable bridge 12 which, in turn, is connected to ground or chassis 15. Similarly, a terminal 17 in the socket 9 is provided for activating the customary and commercial PROM 16, or deactivating the PROM 16. The terminal 17, for example, can be connected directly to ground or chassis, permitting activating of the standard or commercial PROM 16 upon insertion of the PROM 16 into the socket 9.

OPERATION

Under ordinary operating conditions, the additional memory 16 is not inserted into the socket 9. The microprocessor 1 communicates with the PROM chip 5. The severable bridge 12 is closed, and the terminal 11 of the PROM memory chip 5 is connected to ground or chassis potential. The resistance values of the decoupling resistors 3 are so dimensioned that the address inputs 4 of the PROM memory chip 5 receive signals without degradation of the logical signal levels; yet, upon disabling of the memory chip 5, no excessive loading is applied to the respective address inputs of signals which, then, will be applied to the address terminals 8 of the socket 9 for connection to the additional PROM 16.

If a malfunction is detected in the data derived from the memory chip 5, or if the data are to be replaced by other data, it is only necessary to insert a PROM or ROM 16 into the base 9, with the appropriate alternative data stored therein, and sever the bridge 12. The terminal 11 of the PROM 5 is then connected via resistor 13 to the voltage level of the terminal 14. The usual arrangement—which is accepted here—has the effect that the PROM memory chip 5 will not respond to address signals at the address input 4 and will not provide data signals at the data output terminals 7. The PROM 16 has a hard-wired connection of a terminal, coupled to a terminal in the base and connected as terminal 17 to ground or chassis 15. This connection, within the additional memory, activates the PROM 16 to provide output signals via its connecting terminals and lines 10 connected to the base 9. In this way, the PROM 16, as a commercial structure, can supply data to the microprocessor 1 without interfering feedback from the memory chip 5.

The substrate S, on which both the micrprocessor 1 and the memory chip 5 as well as the base 9 are secured is shown only schematically, since such an arrangement is well known.

As an example, the microprocessor may be of the type: Motorola 6805 R3

The memory chip 5 was of the type: Valvo 82SA3A (chip)

The respective lines 2, 4, 6, 7 were applied by thick-film technology on a suitable ceramic-like substrate S. A suitable additional memory 16, insertable in a commercial socket therefor, is: sames as above: Valvo 82SA3A (DiP)

Suitable resistance values 3, for a system operating at 5 V, are: 2.3 kΩ

A suitable value for resistor 13 is: 5 kΩ

We claim:

1. A method of supplying replacement data in an automotive data processing system having
   - a substrate (S);
   - a microprocessor (1) constructed in semiconductor hybrid technology, applied to the substrate;
   - a data memory chip (5) applied to the substrate;
   - a plurality of address lines (2, 4) and data lines (6, 7) connecting the microprocessor (1) and the memory chip (5); and
   - a terminal socket (9, 9*a*) also connected to the plurality of address lines (2, 4) and data lines (6, 7) leading to the microprocessor; comprising the steps of
   - recording said replacement data in an additional data memory (16);
   - applying a "disable" signal to an "enable-disable" input terminal (11) of the memory chip upon detection of malfunction, supply of erroneous data, or supply of inappropriate data from the memory chip (5); and
   - in one operation, simultaneously inserting the additional data memory (16) into the terminal socket (9, 9*a*) and applying an enabling potential to a terminal of the additional memory (16) to thereby place the additional data memory (16) in operative relation with the microprocessor (1).

2. Method according to claim 1, further comprising decoupling the connection lines (2, 4) between the microprocessor (1) and the memory chip (5) to prevent spurious signals from passing in the circuit within the memory chip during the time the "disable" signal is applied thereto.

3. In an automotive data processing system having
   - a substrate (S);
   - a microprocessor (1), constructed in semiconductor hybrid technology, applied to the substrate;

a data memory chip (5) secured to the substrate; and a plurality of address lines (2, 4) connecting the microprocessor (1) and the memory chip, and a plurality of data lines (6, 7) connecting the microprocessor (1) and the memory chip, said address and data lines effectively permanently connecting the microprocessor (1) and said data memory chip (5), the improvement comprising means for supplying to the microprocessor a set of data alternative to the data stored in the data memory chip (5), namely:

an additional data memory (16) containing said alternative data;

a memory insertion socket (9) effectively permanently connected to said address line (2) and said data line (6) leading to the microprocessor; and means (12, 17) for selectively disabling application of data to the data lines from the memory chip (5) and for selectively enabling supply of data from said additional memory (16) upon insertion thereof into the memory socket (9).

4. System according to claim 3, wherein the substrate comprises a hybrid circuit substrate.

5. System according to claim 3, wherein the additional memory (16) comprises a read-only memory (ROM).

6. System according to claim 3, wherein the additional memory comprises a programmable read-only memory (PROM).

7. System according to claim 3, including a severable externally accessible connection line (14, 12, 15) coupled to the memory chip (5) for selectively severing said severable connection and thereby disabling supply of data from the memory chip (5) to the microprocessor.

8. System according to claim 3, further including the coupling resistors (3) of essentially similar resistance values serially connected between the address output lines (2) from the microprocessor and the address input lines (4) to the memory chip;

direct connections (6, 7) formed between the microprocessor and the data lines of the memory chip;

connecting lines formed on the substrate between the address lines (2) from the microprocessor and address terminals (8) of the additional memory socket (9);

data lines formed on the substrate and connected between the data lines (6) from the microprocessor and data terminals on the additional socket (9); and an "enable" terminal (17) on the additional socket (9) connectable to a voltage terminal (15) at a predetermined voltage level (ground or chassis).

9. System according to claim 8, further including a severable circuit connection (14, 13, 12, 15) connectable to an "enable-disable" control terminal (11) of the memory chip, and a voltage source (+5 V) connected to said circuit connection, which upon, severing said circuit connection, places on the memory chip a deactivating logic voltage level, the deactivating logic voltage level being applied to the memory chip (5) being complementary to the logic voltage level connected to the "enable" terminal (17) on the additional terminal socket (9).

* * * * *